United States Patent [19]

Raloff et al.

[11] Patent Number: 5,384,447
[45] Date of Patent: Jan. 24, 1995

[54] ELECTRIC ARC WELDING GUN

[75] Inventors: Valgene E. Raloff, Grant Park; Frank J. Britto, Jr., Bensenville; Glen A. Jones, Wilmington, all of Ill.

[73] Assignee: Bernard Welding Equipment Company, Beecher, Ill.

[21] Appl. No.: 1,083

[22] Filed: Jan. 6, 1993

[51] Int. Cl.⁶ .............................................. B23K 9/173
[52] U.S. Cl. ......................... 219/137.31; 219/137.52; 219/137.63
[58] Field of Search .............. 219/136, 137.41, 137.44, 219/137.52, 137.63, 137.31

[56] References Cited

U.S. PATENT DOCUMENTS 3,469,070 9/1969 Bernard et al. ..................... 219/130
3,514,570 5/1970 Bernard et al. ..................... 219/130

FOREIGN PATENT DOCUMENTS 1513907 6/1978 United Kingdom .
2098115 11/1982 United Kingdom .

OTHER PUBLICATIONS

Japanese publication "New CS-CP Welding Torch", Oct. 1989.
Tweco ® Eliminator TM brochure, by Tweco Products, Inc. (Undated).
Magnum TM brochure, "200, 300 Gun and Cable Assembly", Lincoln Electric, Nov., 1990.
Bernard ® brochure "EZ Feed II Mig Guns", (Undated), Reference No. EZ II-4-5.
Bernard ® brochure "EZ Feed II Mig Guns Parts List", (Undated), Reference No. EZ II-4-5.
Bernard ® Operations Manual, "European EZ Feed II Mig Gun", Apr. 1, 1990, Reference No. EZ II-2-3-4-6 Euro.
Bernard ® brochure "EZ Feed II Mig Guns", (Undated), Reference No. RA9052.
Bernard ® brochure "EZ Feed 160... The New Lightweight Champion", Jun. 1, 1985.
Bernard ® operations manual, "EZ Feed II Mig Gun", (Undated), Reference No. EZ II-2-3-350.
Bernard ® brochure "EZ Feed G, H & F Mig Guns Parts Breakdown", Dec. 1, 1985.

*Primary Examiner*—Clifford C. Shaw
*Attorney, Agent, or Firm*—Willian Brinks Hofer Gilson & Lione

[57] ABSTRACT

An apparatus for welding a workpiece comprises a body tube having a tapered portion defining a first angle, and an end fitting releasably connectable with the body tube and having a tapered portion defining a second angle. The tapered portion of the body tube is releasably connectable with the tapered portion of the end fitting. The first angle differs from the second angle by a distance sufficient for facilitating manual separation of the tapered portion of the body tube from the tapered portion of the end fitting. A liner has a first portion disposed within the end fitting and a second portion disposed within the body tube. A connection member operatively releasably connects the first portion of the liner with the second portion of the liner. A member is disposed on the body tube or the end fitting for releasably connecting the body tube to the end fitting. A positive stop member is formed the body tube or the end fitting for positively retaining the member on the body tube or the end fitting.

24 Claims, 3 Drawing Sheets

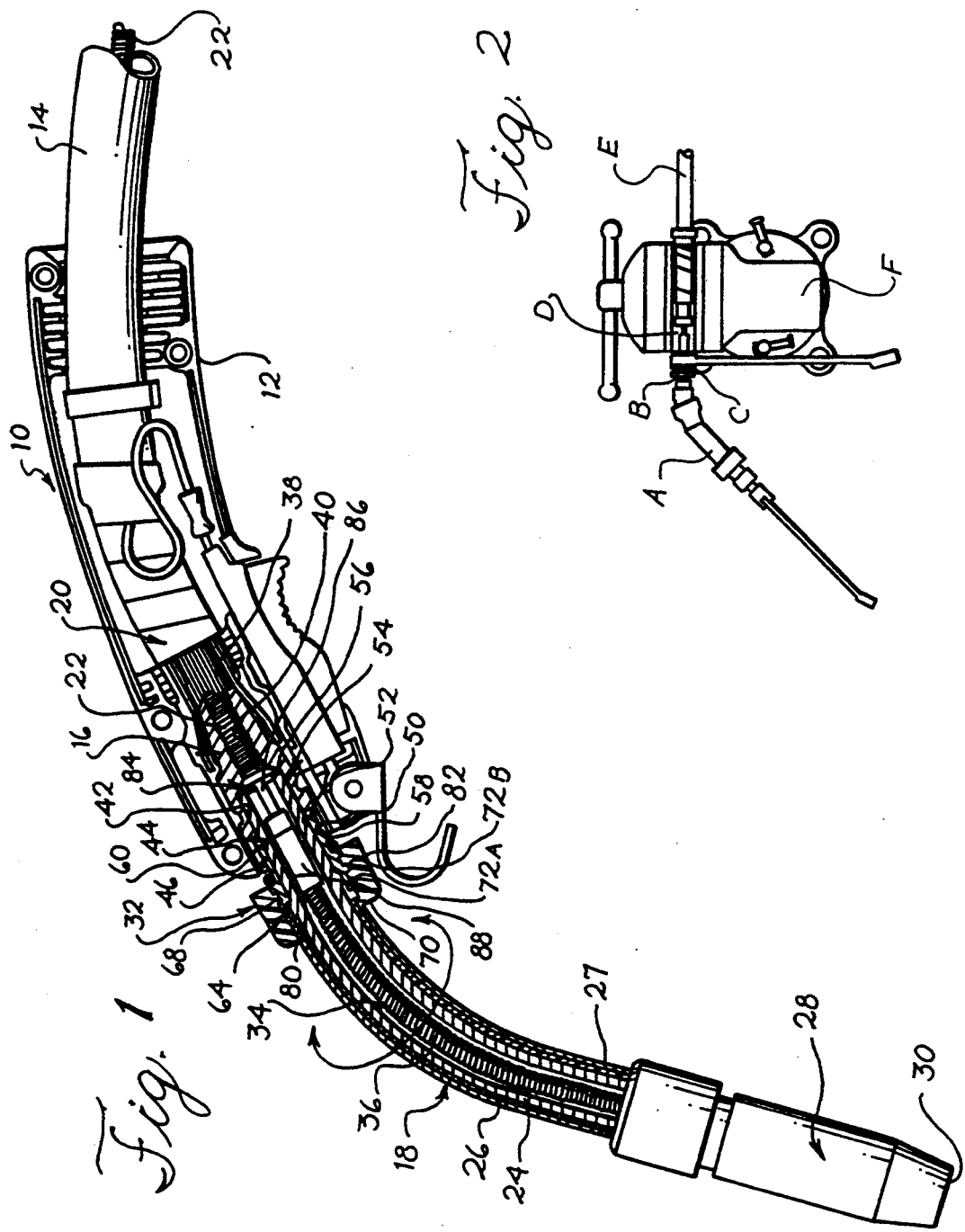

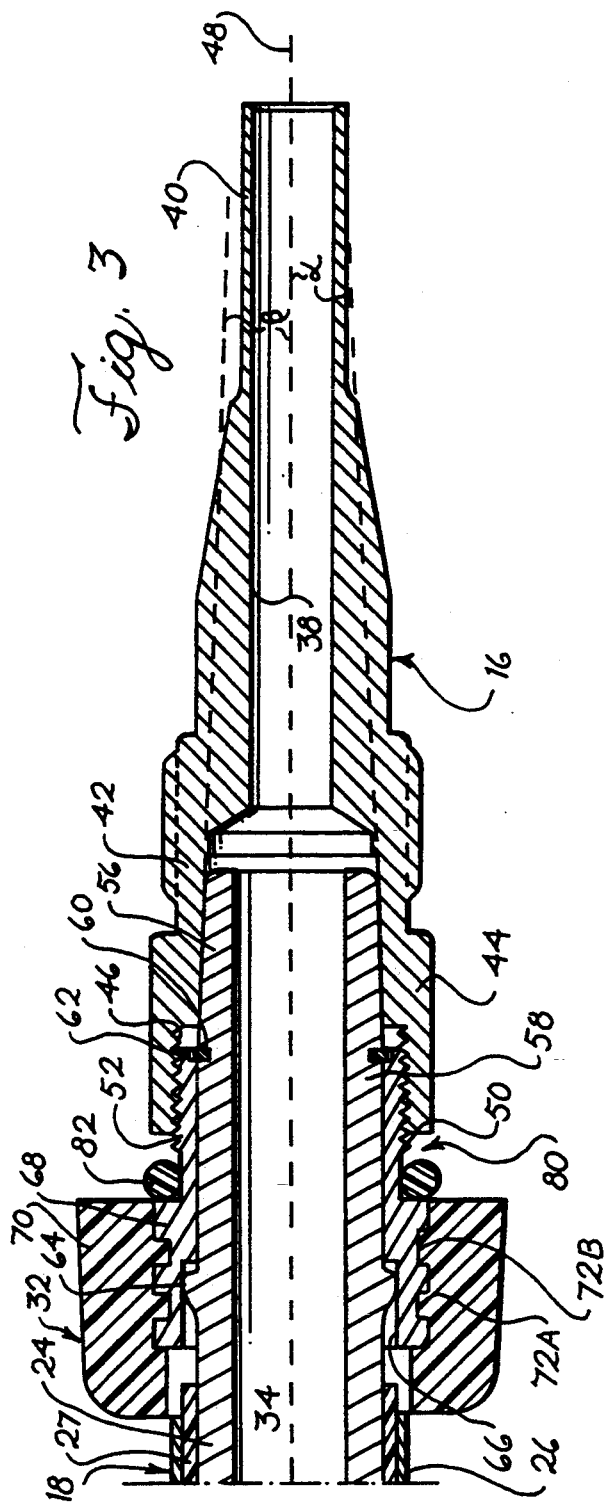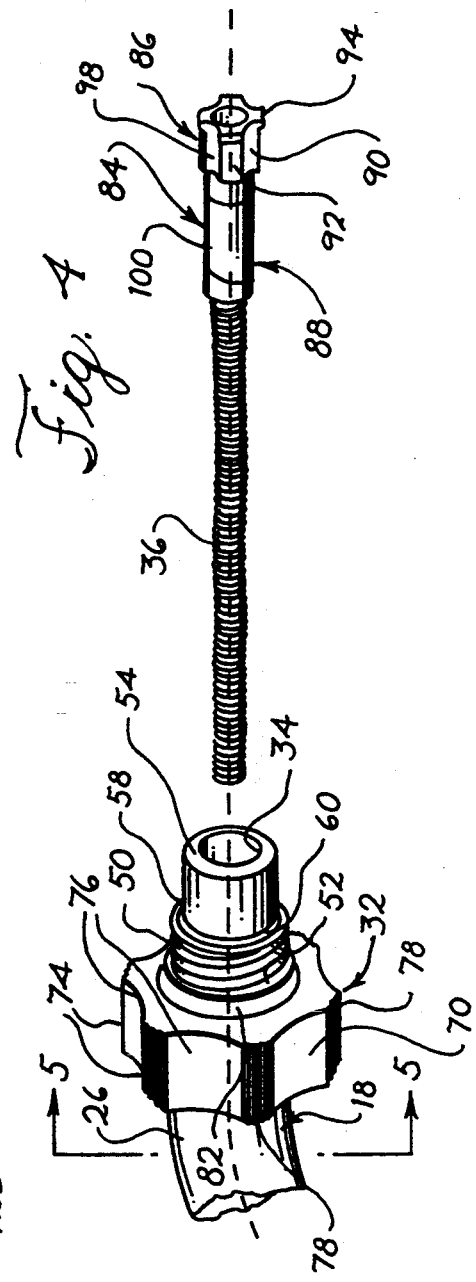

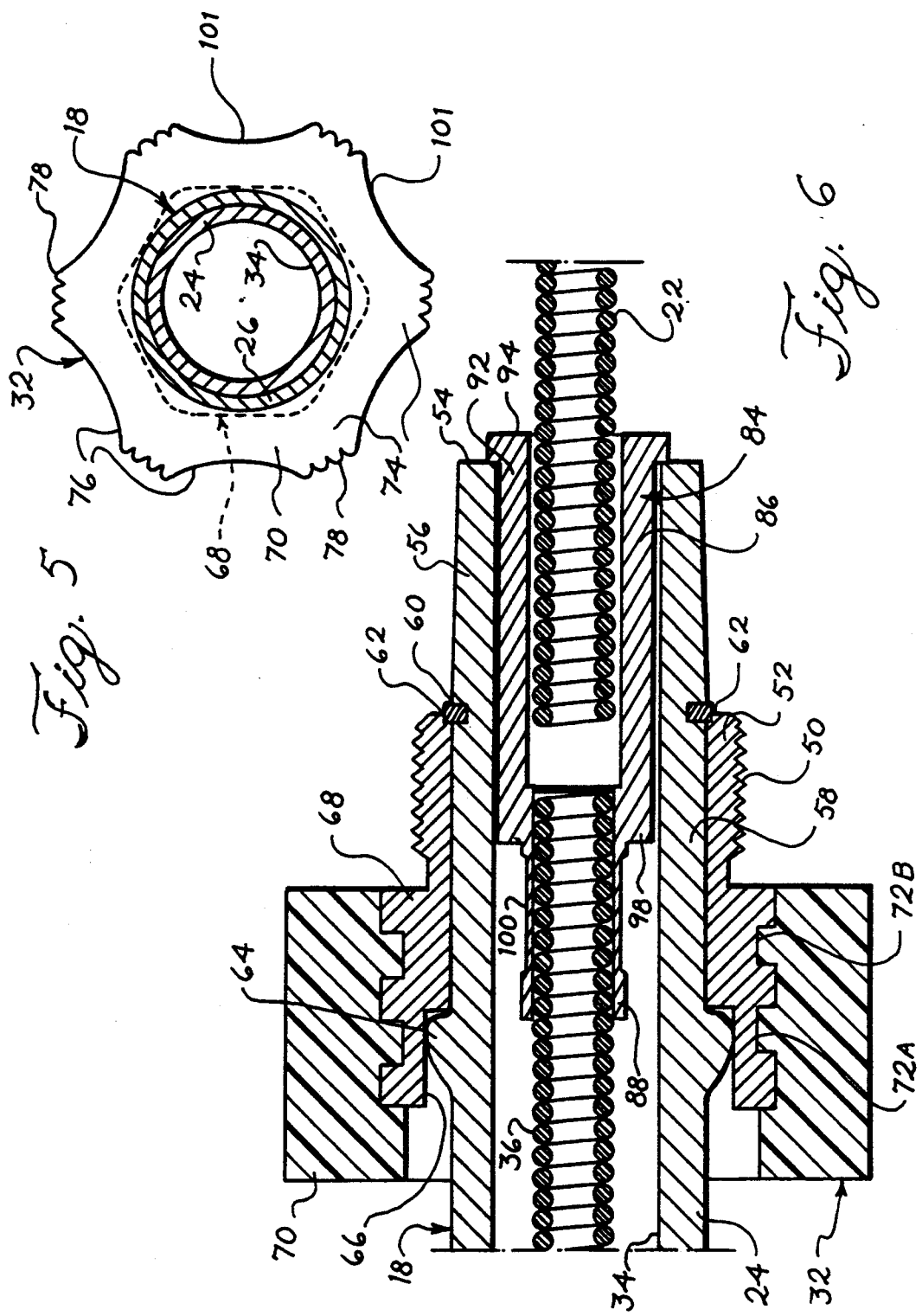

ELECTRIC ARC WELDING GUN

BACKGROUND OF THE INVENTION

The present invention relates generally to a novel construction for an improved welding apparatus, and more specifically to a novel construction for an improved electric arc welding gun/torch.

Welding processes are widely used in modem day manufacturing. One such welding process is commonly referred to as arc welding, which utilizes an electrical current, and an electrode. The American Welding Society ("AWS") defines arc welding with seven subclasses, viz. shielded metal arc welding, submerged arc welding, gas metal arc welding, flux cored arc welding, gas tungsten arc welding, plasma arc welding, and electroslag welding. Electrical current heats the tip of an electrode such that the electrode and the adjacent portions of the workpiece become hot enough to fuse. In order to prevent molten metal from reacting with components of the surrounding ambient atmosphere, a fluid flow of a shielding gas, such as helium, argon and the like, or a solid slag surrounds the molten metal and the adjacent portions of the workpiece.

In some instances, these things needed for arc welding are provided in the form of a welding apparatus or gun which facilitates manipulation of the electrode and the shield by a workman during welding. One example of an arc welding gun of the prior art generally comprises a handle member connected to an end of a composite cable which delivers arc power and shielding gas from suitable sources. A cone nut is located at the end of the composite cable, and the cone nut has threads connectable with complementary threads on an end fitting. The end fitting has another set of threads which are engagable with complementary threads on a lock nut for operatively connecting a body tube to the end fitting. Because the end fitting and the body tube are electrically conductive, an insulating member may be positioned over exposed portions of the end fitting and the lock nut. A liner, in which a consumable electrode can be inserted, extends through the composite cable and the body tube, and terminates adjacent a distal end of the body tube. A contact tip for weldingly contacting the electrode is disposed at the distal end of the body tube.

Currents used in arc welding can be on the order of hundreds of Amps. These currents generate sufficient heat, especially at and adjacent the contact tip, which, in combination with other effects of arc welding, can cause deterioration of portions of the welding gun. The body tube and the liner are often susceptible to this deterioration. In addition, body tubes may have certain, predetermined configurations which make them particularly adept at forming a certain weld, may have particular utility with a given workpiece, etc. The liner may be abraded within the body tube as the electrode is continuously used. Therefore, it may become desirable to replace the body tube and/or the liner in order to insure efficient welding of the workpiece. However, the method of replacing a body tube and/or a liner may be quite difficult or tedious and may be relatively expensive in time and in labor.

A typical method of replacing a body tube A may be more easily understood with reference to FIG. 2. To replace a body tube A, the handle member must be removed. The insulating member is slid off of the lock nut B and the end fitting C to reveal the driving flats of both elements. The cone nut D at the end of the composite cable E is inserted into a vise F, and the vise F is activated to firmly hold the cone nut D against rotation. Now, a first wrench is applied to the lock nut B to rotate the lock nut B with respect to the end fitting C to disengage the threaded connection therebetween. A second wrench is applied to the end fitting C to fix the end fitting C against rotation with respect to the cone nut D or the lock nut B. Force is applied to the first wrench to rotate the lock nut B while another force is applied to the second wrench to hold the end fitting C fixed. This force application continues or is increased until the threaded connection between the lock nut B and the end firing C is loosened. Once the connection is loosened, the body tube A is rotated with the lock nut B and removed completely from the end fitting E.

Because the threaded connection between the lock nut B and the end fitting C is torqued, often to about 15 foot-pounds, the forces required to break the threaded connection may be rather significant. In addition, appropriate portions of the body tube A and/or the end fitting C may be tapered at a slight incline. This taper may make the time required to disassemble the body tube A and the end fitting C rather long, which increases the down time of the welding gun, and which possibly correspondingly decreases the amount of revenues that can be generated by use of the gun. Alternatively, two workmen, one working each of the wrenches, may cooperate to loosen the connection, but this method is relatively labor intensive, thereby also possibly decreasing associated revenues.

The liner extends through the axial length of the composite cable E and into the body tube A. The liner may be ten to fifteen feet long or longer depending upon the length of the composite cable E desired for a specific welding application. While the old liner may be relatively easily removed by pulling it through the open, distal end of the composite cable connection, the new liner will have to be carefully inserted through the entire length of the composite cable E. This installation process may be tedious, requires removal of the welding gun from production, possibly further reducing revenues. In addition, it is to be noted that the operative welding temperatures, about 400 degrees Fahrenheit, tend to be concentrated at the contact tip of the welding gun. Thus, significant deterioration of the liner may only occur immediately adjacent the contact tip. This means that, in some instances, deterioration of a few inches of the liner may require replacement of the entire liner, which may be almost an order of magnitude longer than the deteriorated portion of the liner. Because the entire liner must be replaced due to deterioration of such a small portion thereof, liner replacement of the present art can be wasteful and also costly. These things can increase the costs of maintaining and/or using a welding gun because of increased labor and parts costs.

Because of these characteristics, among others, of some prior art welding apparatuses, such as arc welding guns and the like, it is desirable to provide an improved welding apparatus which is not subject to some, if not all of the above-discussed characteristics of the prior art welding guns. The present invention is intended to provide such an improvement.

SUMMARY OF THE INVENTION

The present invention provides an improved welding apparatus, such as an arc welding gun and the like. The welding gun facilitates removal of a body tube therefrom without the use of tools, thereby possibly reducing the time and labor needed to replace a body tube. In addition, with the welding gun of the invention, it is not necessary to replace the entire axial length of a liner to remove a relatively small deteriorated distal portion of the liner. The welding gun of the invention may be less costly to repair and maintain than some prior art welding guns, and it is possible that utilization of the novel welding gun may result in revenue savings to a user.

A general object of an embodiment of the present invention is to provide a novel construction for a welding apparatus, and especially for an arc welding apparatus.

A more specific object of an embodiment of the invention is to provide a novel construction for a welding gun, and especially for an arc welding gun.

Another object of an embodiment of the present invention is to provide a novel welding gun having a body tube which is replaceable quicker and easier than some prior art body tubes.

An additional object of an embodiment of the invention is to provide a novel welding gun having a body tube which can be removed without the aid of other tools.

A further object of an embodiment of the present invention is to provide a novel welding gun having a construction which makes liner replacement easier than some prior art welding guns.

A novel welding apparatus, constructed according to the teachings of the present invention, comprises a body tube having a tapered portion defining a first angle, and an end fitting releasably connectable with the body tube and having a tapered portion defining a second angle. The tapered portion of the body tube is releasably connectable with the tapered portion of the end fitting. The first angle differs from the second angle by a distance sufficient for facilitating manual separation of the tapered portion of the body tube from the tapered portion of the end fitting. A liner has a first portion disposed within the end fitting and a second portion disposed within the body tube. A connection member operatively releasably connects the first portion of the liner with the second portion of the liner. A member is disposed on one of the body tube or the end fitting for releasably connecting the body tube to the end fitting. A positive stop member is formed on the one of the body tube or the end fitting for positively retaining the member on the body tube or the end fitting.

BRIEF DESCRIPTION OF THE DRAWINGS

The organization and manner of the structure and operation of the invention, together with further advantages thereof, may best be understood by reference to the following description taken in connection with the accompanying drawings, wherein like reference numerals identify like elements in which:

FIG. 1 is a partially sectioned side elevational view of a novel welding gun constructed according to the teachings of the present invention;

FIG. 2 is a plan view of a prior art welding gun held within a vise to facilitate removal of a body tube therefrom;

FIG. 3 is an enlarged sectional view of a threaded connection between an end fitting and a body tube of the novel welding gun of FIG. 1 with a jumper liner removed for clarity;

FIG. 4 is a perspective view of a jumper assembly insertable into the body tube of FIG. 1;

FIG. 5 is a sectional view, taken along line 5—5 of FIG. 4 illustrating the construction of a connection member for the welding gun of FIG. 1; and FIG. 6 is an enlarged sectional view of the body tube of FIG. 4 being connected to a cable liner with an end fitting removed for clarity.

DETAILED DESCRIPTION OF THE ILLUSTRATED EMBODIMENTS

While the invention may be susceptible to embodiment in different forms, there are shown in the drawings, and herein will be described in detail, specific embodiments with the understanding that the present disclosure is to be considered an exemplification of the principles of the invention, and is not intended to limit the invention to that as illustrated and described herein.

Referring initially to FIG. 1, a novel arc welding gun 10, constructed according to the teachings of the present invention, is illustrated. It is to be noted that, while the embodiments of the invention will be discussed herein with respect to their employment with arc welding, for the sake of clarity, the embodiments of the invention may be used with any suitable type of manufacturing process without departing from the scope of the invention. In addition, while the embodiments of the invention will be discussed separately, again for the sake of clarity, it is to be fully understood that the embodiments can be combined in any suitable manner without departing from the scope of the invention. Also, some elements of the novel welding gun 10 are well known to those having ordinary skill in the art, and, thus, those elements of the welding gun 10 will be discussed only with sufficient detail necessary to provide the reader with an appreciation of the embodiments of the invention. Furthermore, the embodiments of the present invention can be utilized with certain existing welding apparatuses and guns, such as the EZ FEED and EZ FEED II welding guns available from Bernard Welding Equipment Company of Beecher, Ill.

The welding gun 10 generally comprises a handle portion 12, haft of which is shown in FIG. 1, a composite cable 14, an end fitting 16, and a body tube 18. The handle portion 12 can be made of an electrically insulating material, such as a plastic, and may have a configuration adapted for facilitating manipulation of the welding gun 10 by a workman. The composite cable 14 may be of well known construction and is connected at one end to a suitable source of electrical power and shielding gas, such as helium, argon, carbon dioxide, and the like, not shown. An opposite end 20 of the composite cable 14 is operatively connected to a proximal end of the end fitting 16 by suitable means. The composite cable 14 may have any axial length sufficient to position the welding gun 10 for welding. A cable liner 22 extends substantially axially through the hollow interior of the composite cable 14 and the end fitting 16 in well known fashion. However, a proximal portion of the cable liner 22 terminates distally within the end fitting 16. This is an important difference from some of the welding guns of the prior art, and the significance of this construction will become more clear later. This cable liner 22 construction allows for replacement of a deteriorated portion of the liner 22 without requiring replacement of the entire liner 22, as discussed earlier with respect to FIG. 2.

The body robe 18 comprises an inner element 24, made of a conductive metal such as copper, and an outer element 26, made of a metal such as brass. An insulating element 27, made of an appropriate material, such as a high temperature TEFLON, nylon, or the like, is disposed between the inner element 24 and the outer element 26, which are releasably connectable to the end fitting 16. The insulating element 27 prevents electrical current from flowing from the inner element 24 to the outer element 26. The body tube 18 is straight or bent to define an angle for facilitating the welding process, The angle usually measures 22.5, 30, 45, 60 or 180 degrees. The body tube 18 has a distal welding end 28, opposite to the end of the body tube 18 connected to the end fitting 16, which terminates at a contact tip 30 for weldingly contacting an electrode, not shown. A majority of deterioration of the liner 22 occurs proximate to the contact tip 30. A member or locking nut 32 is disposed around the body tube 18 adjacent the end thereof connectable to the end fitting 16 for firmly attaching the end fitting 16 to the body tube 18. The body tube 18 also includes a through bore 34 extending along the axial length of the body tube 18. The through bore 34 is dimensioned for accepting a jumper liner 36, which forms an operative extension of the cable liner 22. The significance of the jumper liner 36 will be discussed further below.

As shown in FIGS. 1 and 3, the end fitting 16 has a through bore 38 for accepting the cable liner 22 and a portion of the body tube 18 and the locking nut 32. Specifically, the through bore 38 comprises a substantially cylindrical portion 40, a substantially tapered portion 42, and an internally threaded portion 44 including female threads 46. The cylindrical portion 40 has an inner diameter larger than the outer diameter of the cable liner 22 so that the cable liner 22 can be inserted through the cylindrical portion 40. The tapered portion 42 which forms part of a novel structure of the welding gun 10, is located between the cylindrical portion 40 and the threaded portion 44, and the inner surface thereof defines an angle α with respect to a longitudinal axis, represented by dotted line 48 in FIG. 3. In the illustrated embodiment, the angle α measures about 2 degrees. The threads 46 on the threaded portion 44 are matable with complementary male threads 50 on a threaded portion 52 of the locking nut 32 to releasably join the end fitting 16 to the body tube 18. The threads 46 and 50 define a thread profile common to the similar structures on other welding apparatuses available from Bernard Welding Equipment Company of Beecher, Ill. This facilitates interchangability of the embodiments of the present invention with existing welding equipment.

The body tube 18 also includes novel structures unique to the welding gun 10. A proximal end 54 of the body tube 18, and specifically the inner element 24, includes a tapered portion 56 whose outer surface defines an angle β with respect to the longitudinal axis 48 shown in FIG. 3, which measures about 2.5 degrees. It is to be noted that there is an angular differential, measuring about 0.5 degrees, between the angle α and the angle β. This precise measure of this differential and the angles α and β is subject to usual manufacturing tolerances. This differential facilitates removal of the body tube 18 from the end fitting 16, thereby providing for relatively quick change of the body tube 18 and the jumper liner 36 without the need of tools, even when the threaded connection between the end firing 16 and the body tube 18 is torqued to about 30 inch pounds. This advantage of the present invention will be discussed in greater detail later.

The body tube 18 has a substantially cylindrical portion 58 located distally of the tapered portion 56. The locking nut 32 is located around the cylindrical portion 58. In order to positively locate and retain the locking nut 32 about the cylindrical portion 58, a snap ring 60 is attached to the outer diameter surface of the cylindrical portion 58 to limit movement of the locking nut 32 in one direction. As is illustrated more clearly in FIGS. 3 and 6, a proximal end of the locking nut 32 has an annular recess 62 or increased inner diameter portion dimensioned for accepting and covering a portion of the snap ring 60. The annular recess 62 insures that the snap ring 60 will remain in place on the cylindrical portion 58 when substantial loads are applied thereto, and also cooperates with the snap ring 60 to form positive stop means for limiting movement of the locking nut 32 on the cylindrical portion 58 toward the end fitting 16.

In order to positively retain the locking nut 32 on the cylindrical portion 58, a distally located positive stop means is also required. This distally located positive stop means is formed by swaging the material comprising the inner element 24 of the body tube 18 to create a protuberance or raised step 64 on the outer surface of the inner element 24. The step 64 may be annular and projects substantially radially away from the outer surface of the inner element 24 a distance sufficient for positively limiting distal movement of the locking nut 32 on the cylindrical portion 58. In the illustrated embodiment, the step 64 extends away from the outer surface of the cylindrical portion 58 approximately 0.015 inches. It is to be noted, as is evident from FIGS. 1, 3 and 6, that the inner diameter surface of the cylindrical portion 58 of the body tube 18 remains substantially constant, and that the inner diameter of the cylindrical portion 58 is not increased or decreased by the formation of the step 64. Furthermore, by forming the step 64 by a swaging procedure, the overall strength of the body tube 18 is increased.

The locking nut 32 also includes an annular recess 66 or increased inner diameter portion located distally of the annular recess 62. The annular recess 66 is dimensioned to accept the step 64, and cooperates with the step 64 to limit distal movement of the locking nut 32 along the body tube 18. Thus, the relative axial locations of the annular recesses 62 and 66 on the locking nut 32 and of the snap ting 60 and the step 64 on the cylindrical portion 58 are predetermined to positively limit the range of axial movement of the locking nut 32 along the outer diameter surface of the cylindrical portion 58. However, it is to be remembered that those relative axial locations are chosen to provide sufficient axial movement of the locking nut 32 to facilitate joinder of the body tube 18 to the end fitting 16, and that the locking nut 32 is free to rotate about the cylindrical portion 58. Also, while the illustrated embodiment shows one step 64 and one snap ring 60 forming the positive stop means, it is envisioned that the snap ring 60 can be replaced by another step 64 without departing from the invention.

As stated above, the body tube 18 can be releasably joined to the end fitting 16 without the aid of tools. Thus, the threads 50 on the locking nut 32 are engagable with the threads 46 on the end fitting 16 by hand. To facilitate this manual joining of the end fitting 16 with the body robe 18, the locking nut 32 comprises an inner element 68 and a hand nut or outer element 70. The inner element 68 is formed from a metal, such as brass and the like, and is constructed substantially similarly to the locking nuts of the prior art. The outer element 70 is formed of an electrically insulating plastic material which can withstand the operating temperatures of the welding gun 10, which are about 390 degrees Fahrenheit, and can hold at least 8 foot-pounds of torque. The currently preferred material for the outer element 70 is GLASTIC 1412AD (black) which is available from Glastic, Inc.

The outer element 70 can be overmolded onto the inner element 68, or, alternatively, may be molded as a separate piece, slid over the inner element 68 and secured thereto by means of a mechanical or chemical fastening system. In order to insure firm attachment of the inner element 68 to the outer element 70, the inner element 68 is provided with means for keying the inner element 68 to the outer element 70. In the illustrated embodiment, this keying means takes the form of a pair of annular recesses 72A and 72B or reduced outer diameter portions located along the shank of the inner element 68. If the outer element 70 is overmolded onto the inner element 68, the plastic material of the outer element 70 flows into the annular recesses 72A and 72B, thereby insuring a firm bond between the inner element 68 and the outer element 70. The locking nut 32 includes a plurality of driving flats 101 which can assist in efficient torque transmittal from the outer element 70 to the inner element 68 to threadibly engage the male threads 50 on the locking nut 32 with the female threads 46 on the end fitting 16.

The locking nut 32, and specifically the outer element 70, is provided with a configuration for facilitating manual attachment of the end fitting 16 to the body tube 18. This configuration is more clearly illustrated in FIGS. 4 and 5. The illustrated embodiment of the configuration of the locking nut 32 comprises a series of alternating lobes 74 and flutes 76 disposed along the circumference of the outer element 70. Preferably, there are six lobes 74 and six flutes 76 disposed equidistantly along the circumference of the outer element 70, i.e. located every sixty degrees along the circumference. In addition, each lobe 74 includes knurls 78 which can provide for a better grip of the outer element 70. This configuration and the outer element 70 in general facilitate torque transfer from a workman's hand to the inner element 68, which includes the male threads 50. Thus, the locking nut 32 and the end fitting 16 can be joined by hand, and the desired torquing of the threaded joint between the end fitting 16 and the locking nut 32 can be accomplished manually without the need of tools. This can reduce the amount of time required to change liners 22 and body tubes 18. In addition, because the end fitting 16 and the locking nut 32 are tightened and torqued by hand, the possibility of over-torquing of the threaded joint therebetween is reduced. Furthermore, the construction of the body tube 18 and the end fitting 16 allows the body tube 18 to be rotated with respect to the end fitting 16 when the threaded joint between the end fitting 16 and the body tube 18 is tightly tightened or torqued. The body tube 18 can be rotated through a full three hundred and sixty degree arc about its axis, thereby allowing the positioning of the contact tip 30 to a desirable working, operational position. These things can provide greater flexibility in welding and represent significant improvements over the welding apparatuses of the prior art.

As noted above, the outer dement 70 is made from an electrically insulating material. This is necessary because the inner dement 68 is placed within the current path through the welding gun 10. The currents can be quite large, on the order of hundreds of Amps. Specifically, it is expected that the welding gun 10 may be made commercially available in at least 200, 350 and 500 Amp models. Because of these large currents, there may be a possibility that electrical energy may arc across a gap, such as the annular gap 80 between a potential ground circuit, not shown, and the inner element 68 of the locking nut 32. In order to reduce the probability of arcing across the gap 80, an insulating member 82 is located within the gap 80. In an exemplary embodiment, the insulating member 82 comprises a rubber O-ring surrounding the locking nut 32 between the threads 46 and the annulus of the inner element 68.

In addition to providing for relatively quick replacement of the body tube 18, an embodiment of the invention also provides for relatively quick and easy replacement of the cable liner 22. As stated earlier, a portion of the cable liner 22 may deteriorate during welding operation of the welding gun 10. This deterioration tends to be concentrated at a distal portion of the cable liner 22 adjacent the contact tip 30 of the body tube 18, while the proximally located portions of the cable liner 22 may remain substantially intact. Thus, it may be more economical to replace only a small, deteriorated portion of the cable liner 22 than to replace the entire axial length thereof. In addition, by replacing only a small portion of the cable liner 22, the down time of the welding gun 10 can be reduced because the new cable liner 22 would not have to be inserted through the entire length of the composite cable 14. The novel welding gun 10 of the present invention has unique structures which allow this to be done.

As shown more clearly in FIGS. 4 and 6, the welding gun 10 includes a connection member 84 which releasably couples the cable liner 22 in the composite cable 14 with the jumper liner 36 in the body tube 18 such that the jumper liner 36 forms an operative extension of the cable liner 22. Accordingly, while the cable liner 22 within the composite cable 14 may be of the usual length, the length of the jumper liner 36 may be only about the length of any body tube 18. Because the jumper liner 36 is so much shorter than the cable liner 22, the jumper liner 36 may be less expensive compared to the cable liner 22, and the time required to change the jumper liner 36 as compared to the cable liner 22 may be correspondingly reduced. This can reduce the down time of the welding gun 10, and may provide the user with correspondingly increased revenues.

The construction of the connection member 84 is shown in FIGS. 4 and 6. As illustrated, the connection member 84 has a substantially cylindrical configuration, but it is to be recognized that other configurations are also possible as long as the connection member 84 is insertable, in the illustrated embodiment, into the through bore 34 in the body tube 18. The connection member 84 is preferably made from a metal, such as brass, but other materials can also be used.

The connection member 84 comprises a first portion 86 for accepting an end of the cable liner 22 and a second portion 88 which accepts an end of the jumper liner 36. The first portion 86 has an outer diameter larger than the outer diameter of the second portion 88 and substantially equal to the inner diameter of the tapered portion 56 and the cylindrical portion 58 of the body tube 18. This construction allows the connection member 84 to be inserted into and fit relatively snugly within the through bore 34 in the body tube 18. The first portion 86 has an inner diameter larger than the outer diameter of the cable liner 22 and an inner diameter of the second portion 88, which is substantially equal to the outer diameter of the jumper liner 36. Because the inner diameter of the first portion 86 is larger than the outer diameter of the cable liner 22, the cable liner 22 can be inserted into the first portion 86. Moreover, because of the diametric differential between the cable liner 22 and the first portion 86, the inserted end of the cable liner 22 can float within the first portion 86. Thus, the cable liner 22 can float or move within the first portion 86 to accommodate stretching of the composite cable 14, which controls movement of the cable liner 22.

In an alternative construction of the connection member 84, the distal end of the cable liner 22 may not be inserted into the connection member 84, but the distal end of the cable liner 22 may butt up against a proximal end of the first portion 86. With this alternative construction, the first portion 86 does not need the large inner diameter discussed above.

The first portion 86 also has a external configuration for facilitating the functionality of the welding gun 10. Specifically, as is shown more clearly in FIG. 4, the first portion 86 has a number of alternating flutes 90 and lobes 92 equidistantly spaced along the circumference of the first portion 86. In the illustrated embodiment, there are four flutes 90 and four lobes 92, although other numbers are also possible. The flutes 90 define outer diameters smaller than the outer diameters deemed by the lobes 92. The flutes 90 form channels which extend along the axial length of the first portion 86 for allowing gas to pass from the end fitting 16 into the body tube 18.

The lobes 92 also extend along the entire axial length of the first portion 86, define the boundaries of the flutes 90 and form bearing surfaces engagable with the inner diameter surfaces of the tapered portion 56 and the cylindrical portion 58 of the body robe 18, as shown in FIG. 6. Thus, the lobes 92 substantially center the connection member 84 within the through bore 34 in the body tube 18, which provides for easier insertion of the cable liner 22 into the first portion 86. A proximal end of the first portion 86, opposite to the end thereof connected to the second portion 88, is configured to form flanges 94 extending radially outwardly from ends of the lobes 92. The flanges 94 act as positive stops for positively locating the connection member 84 within the body tube 18. In an exemplary embodiment, there is at least one flange 94 associated with each lobe 92. The flanges 94 define an outer diameter greater than the inner diameter of the tapered portion 56 of the body tube 18 and contact the end 54 of the tapered portion 56 of the body tube 18 to limit movement of the connection member 84 into the body tube 18.

As stated above, the second portion 88 has an inner diameter substantially equal to the outer diameter of the jumper liner 36 so that the jumper liner 36 is insertable into the second portion 88. In addition, the first portion 86 has a reduced inner diameter segment 98 adjacent the second portion which defines an inner diameter substantially equal to the outer diameter of the jumper liner 36. An end of the jumper liner 36 is inserted through the second portion 88 up to the proximal end of the segment 98, as shown in FIG. 6. The jumper liner 36 is fastened within the second portion 88 by means of a crimp 100 formed on the second portion 88. In this manner, when the cable liner 22 is inserted into the first portion 86, the jumper liner 36 forms an operative extension of the cable liner 22 so that the cable liner 22 effectively extends through the composite cable 14 to a position adjacent the contact tip 30 of the body tube 18. Once operatively extended, a conductor or electrode can be threaded through the cable liner 22 in common fashion.

The embodiments of the present invention provide a number of distinct advantages over the welding apparatuses of the prior art. The angular differential between the tapered portion 42 of the end fitting 16 and the tapered portion 56 of the body tube 18 facilitates loosening of the end fitting 16 and the body tube 18, which maintains current flow between the end fitting 16 and the body tube 18. The precise measure of the angles defined by the tapered portions 42 and 56 is not as important as the differential between those angles. Accordingly, it is envisioned that the tapered portions 42 and 56 could define a number of different angles without departing from the scope of the invention, as long as the differential or distance between the angles is sufficient for facilitating manual separation of the tapered portion 42 of the end fitting 16 and the tapered portion 56 of the body tube 18. Preferably, this differential or distance is about 0.5 degrees. The outer element 70 of the locking nut 32 allows the locking nut 32 to be threadibly attached by hand. This, along with the thread profiles and the limits of unaided human strength, may prevent over-torquing of the threaded connection between the end fitting 16 and the body tube 18. The locking nut 32 also allows the body tube 18 to rotate about its axis along a three hundred and sixty degree arc, and thereby allows for easy changes of the orientation of the body tube 18.

The construction of the jumper liner 36 and the connection member 84 allows for easier and more economical replacement of a deteriorated portion of the cable liner 22, as compared to some welding apparatuses of the prior art. Stretching of the composite cable 14, which effectively moves the cable liner 22 during operation of the welding gun 10 is compensated for by the clearance between the outer diameter of the cable liner 22 and the inner diameter of the first portion 86 of the connection member 84, i.e. the cable liner 22 floats within the first portion 86 of the connection member 84 as the cable liner 22 stretches. The flutes 90 allow for shielding gas to flow over the connection member 84 during welding so that the presence of the connection member 84 does not affect the efficiency of the welding gun 10. The protuberance or step 64 positively retains the locking nut 32 on the body tube 18 and positively limits axial movement of the locking nut 32 with respect to the body tube 18. In addition, by forming the step 64 by swaging the material of the body tube 18, the body tube 18 has increased strength as compared to a body tube 18 comprised of unswayed material. Each of these embodiments can be combined in any suitable fashion, and the embodiments may also be utilized with existing welding equipment.

While embodiments of the present invention are shown and described, it is envisioned that those skilled in the art may devise various modifications of the present invention without departing from the spirit and scope of the appended claims.

We claim:

1. In a welding apparatus adapted to supply welding wire, electrical power and shielding gas to a workpiece, the improvement comprising:
   a) a body tube having a tapered portion defining a first angle;
   b) an end fitting having a tapered portion defining a second angle;
   c) the tapered portion of the body tube being releasably connectable with the tapered portion of the end fitting; and
   d) the first angle differing from the second angle by an amount sufficient for facilitating separation of the tapered portion of the body tube from the tapered portion of the end fitting.

2. An apparatus as defined in claim 1 wherein the distance is about one half of one degree.

3. An apparatus as defined in claim 2 wherein the tapered portion of the body tube is insertable into the tapered portion of the end fitting; and wherein the first angle is larger than the second angle.

4. An apparatus as defined in claim 3 wherein the first angle measures about 2.5 degrees.

5. An apparatus as defined in claim 1 further comprising
   e) a liner having a first portion and a second portion; wherein the first portion is disposed within the end fitting; wherein the second portion is disposed within the body tube; and further comprising
   f) a connection member for operatively releasably connecting the first portion with the second portion.

6. An apparatus as defined in claim 1 further comprising
   e) a member disposed on the body tube or the end fitting for releasably connecting the body tube to the end fitting; further comprising
   f) a positive stop member formed on the body tube or the end fitting for positively retaining the member on the body tube or the end fitting; and wherein the positive stop member is formed by swaging material of the body tube or the end fitting.

7. An apparatus as defined in claim 1 further comprising
   e) a member disposed on the body tube or the end fitting for releasably connecting the body tube to the end fitting; wherein the member comprises an inner element and an outer element; wherein the inner element comprises a lock nut; and wherein the outer element comprises a hand nut for facilitating manual connection of the body tube to the end fitting.

8. An apparatus as defined in claim 7 wherein the inner element includes an annulus; and wherein a portion of the outer element is disposed within the annulus for coupling the inner element to the outer element.

9. An apparatus as defined in claim 7 wherein the outer element has a configuration for facilitating torque transfer from a human hand to the inner element.

10. An apparatus as defined in claim 7 wherein the member and the end fitting are separated by a gap; wherein the inner element is electrically conductive; and further comprising
    f) an insulating member disposed within the gap for limiting electrical arcs from the end fitting.

11. In a welding apparatus adapted to supply welding wire, electrical power and shielding gas to a workpiece, the improvement comprising:
    a) a body tube releasably connectable with an end fitting;
    b) a liner having a first portion disposed within the body tube and a second portion disposed within the end fitting; and
    c) a connection member for operatively releasably connecting the first portion to the second portion.

12. An apparatus as defined in claim 11 wherein the connection member is inserted into the body tube.

13. An apparatus as defined in claim 12 further comprising a flute and a lobe disposed on the connection member, wherein the flute is adapted to permit fluid flow therethrough and the lobe is engagable with the body tube or the end fitting for positively locating the connection member in said body tube or said end fitting.

14. An apparatus as defined in claim 13 wherein the connection member has a circumference; further comprising
    at least a second flute and a second lobe; and wherein the flutes and the lobes are alternatively spaced along the circumference of the connection member.

15. An apparatus as defined in claim 11 wherein the connection member is insertable the body tube or the end fitting; further comprising
    a flange on the connection member for positively locating the connection member in said body tube or said end fitting.

16. An apparatus as defined in claim 11 further comprising
    a crimp on the connection member for fixedly attaching the first portion or the second portion to the connection member.

17. An apparatus as defined in claim 11 further comprising
    a bore extending through the connection member; wherein the first portion and the second portion of the liner are insertable into the bore; and wherein the bore is dimensioned such that the first portion or the second portion of the liner can float within the bore to accommodate movement of said first portion or said second portion.

18. An apparatus as defined in claim 11 wherein the body tube includes a tapered portion defining a first angle; wherein the end fitting has a tapered portion defining a second angle; wherein the tapered portion of the body tube is releasably connectable with the tapered portion of the end fitting; and wherein the first angle differs from the second angle by a distance sufficient for facilitating separation of the tapered portion of the body tube from the tapered portion of the end fitting.

19. An apparatus as defined in claim 18 wherein the distance is approximately one half of one degree.

20. In a welding apparatus including a body tube having a bore therein and a composite cable having a hollow interior, said bore and hollow interior being in substantial alignment and adapted to deliver fluid therethrough, the improvement comprising:
    said body tube being releasably connectable with an end fitting;
    a liner having a first portion disposed within the body tube and a second portion disposed within the composite cable;
    a connection member for operatively releasably connecting the first portion to the second portion; and
    a flute disposed on the connection member for permitting fluid flow therethrough in a generally axial direction.

21. An apparatus as defined in claim 20 wherein the flute is formed on a circumference of the connection member to direct the flow of fluid along the exterior of the first portion of the liner.

22. An apparatus as defined in claim 21 wherein the end fitting has a bore in substantial alignment with the bore in the body tube and the hollow interior of the composite cable, and wherein the second portion of the liner is disposed within the end fitting bore, the connection member being insertable within one of the body tube and end fitting such that fluid can flow axially along the exterior of the second portion of the liner, through the flute, and along the exterior of the first portion of the liner.

23. An apparatus as defined in claim 22 further comprising a plurality of flutes and lobes, said flutes and lobes being alternatively spaced along the circumference of the connection member.

24. An apparatus as defined in claim 21 further comprising a lobe disposed on the connection member, said lobe being engagable with one of the body tube and the end fitting for positively locating the connection member in said body tube or said end fitting.

* * * * *

UNITED STATES PATENT AND TRADEMARK OFFICE
CERTIFICATE OF CORRECTION

PATENT NO. : 5,384,447
DATED : January 24, 1995
INVENTOR(S) : Valgene E. Raloff et al.   Page 1 of 3

It is certified that error appears in the above-indentified patent and that said Letters Patent is hereby corrected as shown below:

<u>In the Abstract</u>

In line 17 after "formed" insert --on--.

In column 1, line 9, delete "modem" and substitute --modern--.

In column 2, line 14, delete "firing" and substitute --fitting--.

In column 3, line 52, delete the first occurrence of "the".

In column 4, line 47, delete "haft" and substitute --half--.

In column 5, line 4, delete "robe" and substitute --tube--.

In column 5, line 15, delete "process," and substitute --process.--

In column 6, line 51, delete "ting" and substitute --ring--.

UNITED STATES PATENT AND TRADEMARK OFFICE
CERTIFICATE OF CORRECTION

PATENT NO. : 5,384,447
DATED : January 24, 1995
INVENTOR(S) : Valgene E. Raloff et al.

It is certified that error appears in the above-indentified patent and that said Letters Patent is hereby corrected as shown below:

In column 7, line 2, delete "robe" and substitute --tube--.

In column 7, line 32, delete "threadibly" and substitute --threadably--.

In column 7, line 63, delete "tightly" and substitute --lightly--.

In column 8, line 3, delete "dement" and substitute --element--.

In column 8, line 5, delete "dement" and substitute --element--.

In column 9, line 26, delete "a" and substitute --an--.

In column 9, line 34, delete "deemed" and substitute --defined--.

In column 9, line 42, delete "robe" and substitute --tube--.

UNITED STATES PATENT AND TRADEMARK OFFICE
CERTIFICATE OF CORRECTION

PATENT NO. : 5,384,447
DATED : January 24, 1995
INVENTOR(S) : Valgene E. Raloff et al.

It is certified that error appears in the above-indentified patent and that said Letters Patent is hereby corrected as shown below:

In column 10, line 59, delete "unswayed" and substitute --unswaged--.

In The Claims

In Claim 15, line 2, after "insertable" insert --into--.

Signed and Sealed this

Twenty-sixth Day of September, 1995

Attest:

BRUCE LEHMAN

*Attesting Officer*    *Commissioner of Patents and Trademarks*